United States Patent Office 3,253,151
Patented May 24, 1966

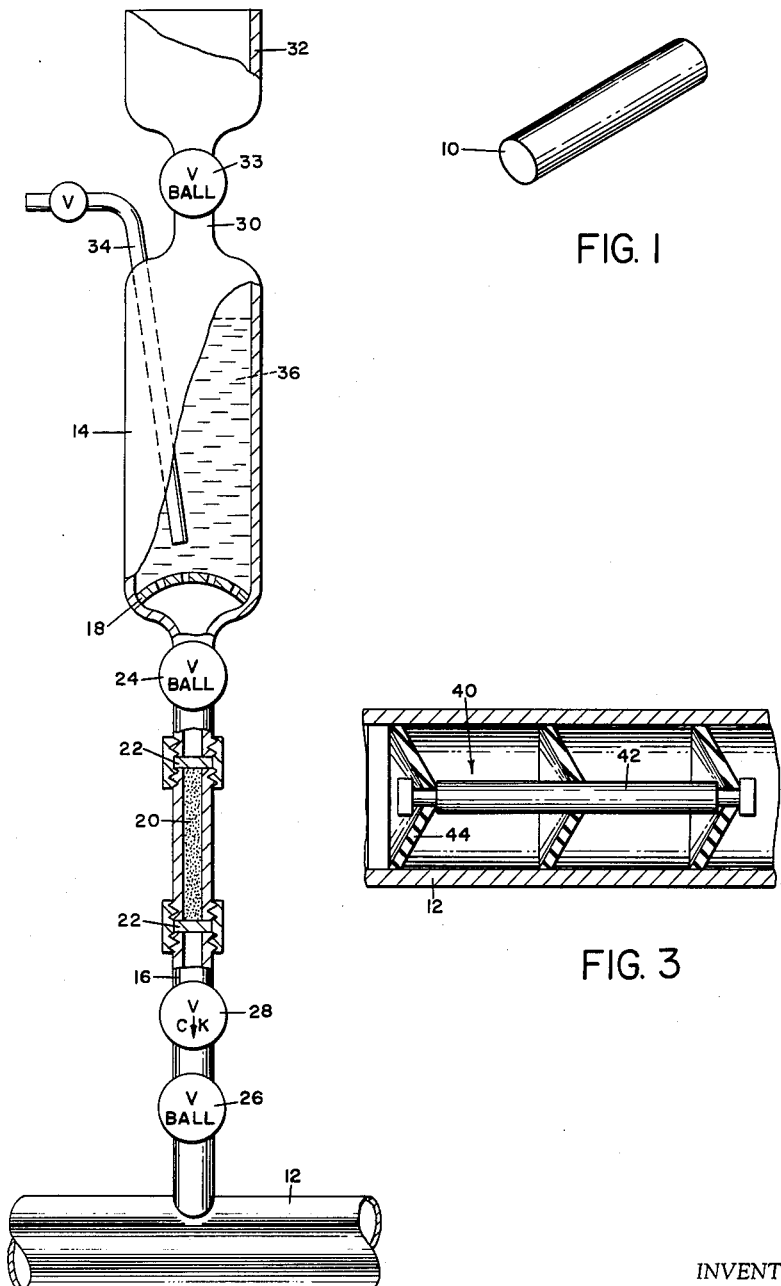

3,253,151
RADIOLOGICAL PIPELINE LEAK DETECTION
Robert D. Gallagher and Preston L. Gant, Ponca City, Okla., assignors to Continental Oil Company, Ponca City, Okla., a corporation of Oklahoma
Filed June 11, 1962, Ser. No. 201,542
23 Claims. (Cl. 250—106)

This invention relates, as indicated, to the detection of leaks in pipelines. More particularly, but not by way of limitation, the present invention relates to an improved tracer fluid and its method of preparation and use for pipeline leak detection.

As it is well known in the pipeline division of the oil industry, the location of leaks in pipelines is an ever present and sometimes perplexing problem. The time-honored method of locating leaks is for a man to walk along the path of the pipeline and use his senses of vision and smell for locating leaks. Another method which has been used extensively is for a pilot to fly an aircraft at a relatively low altitude over the path of the pipeline to observe any unusual surface deposits of oil. However, both of these methods are inefficient, and the pipeline walker, particularly, is slow. Pipelines are normally buried over substantial distances and pipelines frequently extend for many miles. Also, gaseous products transported through pipelines provide no visual indications of leaks which can be detected from a low-flying aircraft.

In view of the many shortcomings of manual inspection, substantial effort has been made in recent years to adapt radiological inspection to pipeline leak detection. One system of such leak detection is described and claimed in the co-pending application of Preston L. Gant, Serial No. 802,848, entitled "Pipeline Leak Detection," filed March 30, 1959, and assigned to the assignee of this invention, and is now abandoned. In the system disclosed in such co-pending application, a slug of radioactive tracer fluid is injected in a pipeline and moved through the pipeline by the products being conveyed through the pipeline. The tracer fluid is followed at some distance by a detection unit which is also conveyed through the pipeline by the products being pumped through the pipeline. The tracer fluid is a gamma ray emitter and the detection unit employs a scintillation detector and recording system responsive to gamma rays passing through the pipeline. The theory of the system is that minor portions of the tracer fluid will leak out of the pipeline at the leak points and the remainder of the tracer fluid will be passed completely through the pipeline. The leaking tracer fluid remains adjacent the leaks in the pipeline to provide sources of gamma rays at the various leak locations. The detection unit thus records the leak locations by being responsive to the gamma rays being emitted from the leaked tracer fluid.

The prior radiological leak detection system described above has been a substantial contribution to the art. However, we have found that the system can be substantially improved, particularly with respect to the detection of leaks in pipelines carrying hydrocarbon fluids. When a radioactive organic material is injected into such a pipeline, it has been found that any trace of inorganic material which may be formed in the preparation (or carried over from the initial reactants) very quickly reacts with, or deposits on, the dirt, rust and scale which is commonly found in such pipelines. This combination leaves a very small amount of the total radioactivity behind the main slug of tracer fluid, and is washed out only with exceedingly long flushing of the pipeline by the use of hydrocarbon fluids and scrapers to remove as much scale as possible, before passage of the radiation detector through the line. With a lengthy cleaning and flushing operation, the radioactive material which has leaked out at any point in the line will be backed away from the pipe and reduce the sensitivity of the system. Also, it is highly desirable to use short half-life materials, and the gamma ray emissions from the leaked radioactive material will be substantially reduced by the end of a lengthy cleaning and flushing operation.

The present invention contemplates a novel tracer fluid, a method of preparation of the fluid and a method of injecting the tracer fluid into a pipeline carrying hydrocarbon products. The tracer fluid is soluble in the hydrocarbon product being carried by a pipeline; is a strong gamma ray emitter, and is chemically inert in that it will not react with or adsorb on the dirt or scale in the pipeline. As a result, the residual radioactivity remaining on the inner surface of the pipeline will be retained at a minimum to dispense with the necessity of flushing and scraping the pipeline. In its broader aspects, the tracer fluid of this invention comprises a radioactive, oil soluble, organic material which is substantially free from other radioactive materials. In a preferred embodiment of the invention, the organic material is irradiated by neutron radiation, and is then contacted with an olefin, acetylene or other oil soluble compound capable of chemically combining with, sequestering or complexing with artificially radioactive inorganic materials. The olefin or other scavenger reacts with the inorganic materials which may have been formed during the neutron radiation, as well as the inorganics which are formed by self-radiolysis during shipment and storage. In addition, it is preferred to irradiate the organic material in the presence of a scavenging material, such as a liquid olefin or acetylene compound, to further assure removal of the inorganic materials, and to filter the tracer fluid through an adsorbing filter material, such as silica gel or charcoal, during injection of the tracer fluid into the pipeline being inspected.

The present invention further contemplates a novel method of injecting a radioactive tracer fluid into a pipeline being inspected, wherein the tracer fluid is deposited in a container connected to the pipeline in such a manner that operators of the system will not be exposed to or contacted by the radioactive material. Radioactive material is easily forced from the container by an inert gas through an adsorbing filter bed directly into the pipeline to be inspected to minimize the handling of the radioactive material and provide a slug of tracer fluid in the pipeline which is subsequently utilized for the detection of leaks in the pipeline.

An important object of this invention is to efficiently and economically locate leaks in pipelines carrying hydrocarbon products.

Another object of this invention is to provide a method of radiological detection of leaks in pipelines carrying hydrocarbon products wherein a minimum of residual radioactive materials are deposited on the inner surfaces of the pipeline.

Another object of this invention is to eliminate the necessity of flushing or scraping a pipeline carrying hydrocarbon products following the passage of a radioactive tracer fluid through the line and prior to passage of a detection unit through the line.

A further object of this invention is to provide a novel organic tracer fluid which contains no inorganic radioactive materials for use in the radiological detection of leaks in a pipeline carrying hydrocarbon products.

Another object of this invention is to provide a novel method of preparation of an organic tracer fluid wherein all radioactive inorganic materials formed in the tracer fluid during the original irradiation of the material and by self-radiolysis of the material are solubilized or removed.

A still further object of this invention is to provide a method of injecting a tracer fluid into a pipeline carrying hydrocarbon products wherein the tracer fluid will be purified of all inorganic materials and all solid materials which would tend to deposit on the inner walls of the pipeline during transportation of the tracer fluid therethrough.

Another object of this invention is to provide a non-hazardous and efficient method of injecting a tracer fluid into a pipline.

Other objects and advantages of the invention will be evident from the following detailed description when read in conjunction with the accompanying drawings which illustrate the invention.

In the drawings:

FIGURE 1 is a perspective view of a capsule or container in which the organic material is preferably irradiated and transported to the inspection site.

FIGURE 2 is a schematic elevational view, partially in section, of the apparatus utilized in injecting a tracer fluid into the pipeline.

FIGURE 3 is a schematic cross-sectional view through a section of a pipeline illustrating a detection unit disposed therein, with the detection unit being shown partially in elevation.

The basic starting material for the tracer fluid of this invention may be any oil soluble organic compound which will become a strong gamma ray emitter by being subjected to neutron irradiation. It is also highly desirable that the resulting radioactive material have a relatively short half-life, such as from one to eight days, in order that the material will become harmless in a relatively short period of time after being used in a testing operation. Examples of organic materials meeting these specifications are iodobenzene, bromobenzene, dibromobenzene, 1-bromo-2-iodobenzene, bromonaphthalene, bromobiphenyl, bromoterphenyl, bromobutane, triphenylarsine (arsenic triphenyl) and triphenylstibine (antimony triphenyl) trimethylarsine, triethylarsine, dimethylbromarsine, tetraethyldiarsine, trimethylstibine and triethylstibine. Of the antimony and arsenic compounds, the triphenylarsine and triphenylstibine are preferred due to their relatively greater stability in the presence of any water which may be in the system than the other compounds. However, when the pipeline is essentially water-free, the other arsenic and antimony compounds may be used.

In preparation of the tracer fluid, the organic compound is sealed in a suitable capsule, such as a cylindrical capsule 10 illustrated in FIGURE 1 of the drawings, to prevent contamination of the reactor in which the organic compound is irradiated. The capsule 10 may be easily formed by cutting a short section of an aluminum tubing and sealing the opposite ends of the tubing. The organic material is irradiated in the capsule 10 in a sufficient quantity of material, and with a sufficient neutron flux and irradiation time, to produce a quantity of radioactive material of from 50 millicuries to 5000 millicuries.

An activity of less than 50 millicuries is insufficient for detecting leaks in pipelines, and quantities larger than about 5000 millicuries are hazardous to handle without elaborate shielding.

As it is known, the amout of material and irradiation conditions are controlled by the following formula:

$$A = NfS \cdot \sigma$$

where
$A$=activity in disintegrations/second (d./s.), $3.7 \times 10^7$ d./s.=1 millicurie (m.c.),
$N$=number of target nuclides,
$f$=neutron flux (in neutrons/cm.$^2$/sec.),
$\sigma$=neutron cross sections in barns,
$S$=saturation factor (varies with isotope being used).

As an example of the application of the above formula, we have activated dibromobenzene to produce 700 millicuries of $Br^{82}$ by irradiating a six-gram sample of dibromobenzene at a flux of $2 \times 10^{14}$ neutrons/cm.$^2$/sec. for a period of nine minutes. $Br^{82}$ has a half-life of 35.8 hours, dibromobenzene is quite soluble in organic solvents, and is highly useful in the tracer fluid of this invention. Similarly, the irradiation of six-gram samples of triphenylarsine and triphenylstibine at a flux of $2 \times 10^{14}$ neutrons/cm.$^2$/sec. for ten minutes will produce 1700 milicures of $As^{76}$ and 450 millicuries of $Sb^{122}$, respectively. Both of these compound are also quite soluble in organic solvents. The arsenic-76 has a half-life of 26.4 hours and the antimony-122 has a half-life of 67 hours. Iodine-131 compounds may also be used, but are less desirable than the compounds of the other radioisotopes mentioned because of the weaker radioactive emanations of the iodine-131.

The organic compound will produce the necessary radioactive material when only the organic compound is sealed in the capsule 10. However, small quantities of inorganic materials are formed during the irradiation, and, to a lesser extent, by self-radiolysis during shipment or storage of the material. For example, small quantities of $Br_2$ and HBr are formed in the neutron irradiation of dibromobenzene. In the case of arsenic-containing compounds, arsine ($AsH_3$) may be formed, while stibine ($SbH_3$) may be a by-product of the radiolysis of organo-antimony compounds. Therefore, it is highly desirable to add to the organic compound an olefinic compound or other oil soluble scavenging compound capable of solubilizing these radioactive inorganic materials before the organic compound is sealed in the capsule 10.

A number of oil soluble materials may be used to prevent the radioactive inorganic materials from reacting with or being deposited upon dirt and scale on the walls of the pipeline. Examples of such scavenging materials are stilbene, 1,4-diphenylbutadiene, methylisobutylketene (for $I^{131}$), chelating solvents such as thenoyltrifluoroacetone, turpentine (for arsine), triphenylmethane, diphenylpicrylhydrazyl, 1-hexyne, phenylacetylene, 1-heptyne, 1,5-hexadiene-3-yne, 1-nonene, 2,3-dimethyl-2-heptene, 1,3-pentadiyne, 2-methyl-1-buten-3-yne, cyclopentadiene, and 1-methylcyclobutene. The preferred scavenging materials are alkene (olefinic) and alkyne (acetylenic) compounds, which because of their unsaturation, readily combine by addition with free iodine and bromine, and hydrobromic and hydriodic acids. The most preferred scavenging materials are olefinic compounds. The scavenging material may be used in any amount sufficient to remove the described inorganic materials, and preferably homogeneously mixed with the organic starting material. Typical examples of acetylenic compounds which may be used are stilbene, 1,4-diphenylbutadiene, squalene, 1-hexyne, 1-heptyne, 1,5-hexadiene-3-yne, 1-nonene, 2,3-dimethyl-2-heptene, 1,3-pentadiene, cyclopentadiene and 1-methylcyclobutene.

Since the effectiveness of olefinic and acetylenic materials in scavenging arsine and stibine is not great, these materials, when present, should be subjected to further or additional separatory techniques which will subsequently be described.

When the capsule 10 is formed of aluminum, the capsule may be used for shipping the radioactive material, as well as storage of the material, before use. It will be understood, of course, that the material cannot be stored for any appreciable length of time when the half-life of the material is relatively short, since the material must be an active gamma ray emitter when used in an inspection operation.

The tracer fluid is further prepared and injected into the pipeline 12 by means of the apparatus illustrated in FIGURE 2 of the drawings. This apparatus comprises a closed container 14 supported above and in communication with the pipeline 12 by a conduit or pipe 16 which may be easily welded to the pipeline 12. The container 14 may be easily formed out of sections of pipes and is provided with a screen or other suitable coarse filter device 18 in the lower end portion thereof. Also, a filter bed 20 of an adsorbing material, such as silica gel or charcoal, is supported in the conduit 16 between fritted steel plates 22. Suitable full-opening valves 24 and 26, such as ball valves, are interposed in the conduit 16 above and below the filter bed 20 to isolate the filter bed when and as desired and to prevent contamination between the container 14 and the pipe 12 before the injection of the tracer fluid is desired. Also, a suitable check valve 28 is interposed in the conduit 16 between the filter bed 20 and the pipeline 12 to prevent a retrograde flow of the pipeline fluids upwardly through the filter bed.

The upper end 30 of the container 14 is connected to a suitable funnel 32 through another full-opening valve 33, such as a ball valve. A gas injection line 34 is extended downwardly through the container 14 and terminates slightly above the coarse filter 18 for the injection of an inert gas and/or olefinic gas, as will be described.

In operation of the apparatus illustrated in FIGURE 2, the container 14 is first isolated from the pipeline 12 by closing of the valves 24 and 26 and is partially filled with an organic solvent 36 which will not contaminate the hydrocarbon fluid being pumped through the pipeline 12. In fact, the solvent 36 may be the same hydrocarbon that is being pumped through the pipeline 12 in many inspection operations. We have also used toluene, hexene or nonene in inspection operations. Instead of a hydrocarbon solvent, certain other hydrocarbon-compatible organic liquids, such as carbon disulfide or carbon tetrachloride, may also be used.

The valve 33 is next opened and the contents of the capsule 10 poured into the container 14 through the funnel 32. We have found that a very convenient way of pouring the contents of the capsule 10 into the container is to support the capsule 10 above the funnel 32 by a suitable rotary tool having a chuck (not shown) in which the capsule 10 is supported; whereupon one end portion of the capsule 10 is cut off with a suitable pipe cutter. The entire container 10 then may be dropped into the funnel 32 to deposit the contents of the container in the funnel. The ball valve 33 is preferably of a size that the parts of the container 10 will fall therethrough into the container 14, such that the contaminated capsule 10 will not then be exposed to workmen in the area. When the container 10 and the contents thereof are passed through the valve 33, the valve is closed.

In the event the solvent in the container 14 contains an olefin, or other effective scavenging material, all traces of halogen-containing inorganics in the radioactive materials will be reacted with the scavenger. However, in the event the solvent 36 does not contain a scavenging material of the type hereinbefore described, the traces of halogen-containing inorganics in the radioactive material may be successfully scavenged by bubbling an olefinic or acetylenic hydrocarbon gas up through the solvent 36 by means of the gas conduit 34. Any highly reactive olefinic or acetylenic gas can be used, such as ethylene, propene, isobutylene or acetylene. These materials react not only with the free bromine but also the HBr when the radioactive material is $Br^{82}$. It may also be noted that even though the solvent 36 contains a scavenging material, it is highly desirable to bubble some gas through the gas line 34 to thoroughly mix the radioactive material with the solvent and assure that virtually all of the inorganics have been eliminated.

When the radioactive material has been thoroughly dissolved in the solvent 36, the valves 24 and 26 are opened to place the container 14 in communication with the pipeline 12. The pressure in the container 14 is then increased by injecting an inert gas, such as nitrogen, into the container through the gas conduit 34. Conveniently, a scavenging, unsaturated hydrocarbon gas such as ethylene or acetylene may also be used to provide the required increase in pressure in the container 14 provided only that the products formed are normally gaseous. When the pressure in the container 14 is slightly above the pressure of the pipeline 12, the tracer fluid comprising the radioactive material and solvent 36 are forced through the conduit 16 into the pipeline 12. The tracer fluid is thus forced through the coarse screen 18 to prevent portions of the capsule 10 from leaving the container 14. The tracer fluid is next forced through the fritted stainless steel plates 22 and the filter bed 20. The filter bed 20 adsorbs further remaining traces of inorganic materials, and, in combination with the fine filters formed by the fritted steel plates 22, eliminates any solid particles (such as undissolved organics) which may be suspended in the tracer fluid. These solid particles would tend to cling to the walls of the pipeline 12 and provide residual radiation to hinder the operation of the system. The clean organic tracer fluid is thus injected through the check valve 28 and the lower ball valve 26 as a slug of fluid into the pipeline 12 while the pipeline 12 is in normal operation. Thus, the system does not require that the pipeline 12 be closed during any portion of the inspection operation, which is a very important practical consideration in an inspection operation.

At this point, it is well to note that though certain organic materials are effective in scavenging the arsenic and antimony-containing inorganic compounds to a limited extent when these materials are present, greater reliance should be placed upon other techniques when such inorganic materials as arsine and stibine are formed during neutron irradiation or autoradiolysis. To a considerable degree, these particular inorganic compounds will be adsorbed by the filter bed 20 when the bed is comprised of silica gel or activated charcoal. It is also very helpful to place a small amount of coarse silica gel in the container 14 with the organic solvent 36 prior to agitation of the solvent by bubbling a gas therethrough in the manner hereinbefore described. In this way, the arsine and stibine are intimately contacted with the silica gel particles and are adsorbed on the surface thereof. These particles are, of course, then strained from the organic solvent 36 as it passes through the filter bed 20.

Another technique which may be used to remove the arsine and stibine contaminants is to cast a grid of metallic arsenic or antimony and incorporate such grid in the filter bed 20. Upon contact with the metallic grid, the arsine (when the grid is arsenic metal) will be decomposed to hydrogen and arsenic metal, and the latter material will be deposited out on the grid. The same action occurs when an antimony metal grid is used to remove stibine.

Finally, a wire gauze of silver oxide may be implanted in the filter bed 20 to react with and remove the arsine and stibine from the organic solvent 36 as it is passed through the filter bed.

The total quantity of the slug of tracer fluid injected into the pipeline 12 will depend upon the size of the line 12 and the length of the inspection run. In normal inspection operations, a total of from 0.5 to 5 kilograms of tracer fluid are used. It may also be noted that of this total quantity of tracer fluid, the radioactive material may vary from .01 to 1 percent. For example, the radioactive material may vary from 0.1 to 10 grams in a total slug of tracer fluid of from 0.5 to 5 kilograms, depending upon the level of radioactivity desired.

The slug of tracer fluid will be conveyed through the pipeline 12 by the hydrocarbon fluid being pumped through the pipeline. If desired, suitable pipeline pigs (not shown) may be inserted in the pipeline 12 ahead of and behind the slug of tracer fluid under some operating conditions, such as when the hydrocarbon fluid is in the form of a gas. The slug of tracer fluid is followed at some distance, say from one-fourth mile to five miles, by a radiological detection and recording unit, such as the unit 40 shown in FIGURE 3.

The unit 40 comprises a cylindrical housing 42 containing a suitable detector and recorder, such as a scintillation counter (for example, using a sodium iodide crystal and multiplier phototube with a suitable rate meter) and a recorder, such as a tape recorder or camera to detect and record gamma rays passing through the pipeline 12. The housing 42 may be conveniently supported in the central portion of the pipeline 12 by cups 44 which extend outwardly from the housing 42 into sealing relation with the inner periphery of the pipeline 12. With this type of construction, the hydrocarbon fluid being pumped through the pipeline 12 reacts on the cups 42 and conveniently conveys the unit 40 through the pipeline.

At the location of any leaks in the pipeline 12, a portion of the slug of tracer fluid will leak out of the pipeline and be deposited in the earth surrounding the pipeline at the leak locations. The deposits of leaked tracer fluid along the length of the pipeline 12 will emit gamma rays which will pass transversely through the pipeline 12. Thus, as the unit 40 is conveyed through the pipeline 12 following the slug of tracer fluid, the gamma ray emissions at the leak points will be detected and recorded for subsequent use in precisely locating the leak points. Also, it will be apparent that the quantity of tracer fluid leaked from the pipeline 12 at any particular point will be in relation to the size of the leak and will provide a corresponding level of gamma ray emissions, such that the resulting record made by the unit 40 will provide an indication of the sizes of the leaks.

The slug of radioactive tracer fluid is preferably pumped from the pipeline 12 into a storage tank or the like along with the hydrocarbon fluid being pumped through the pipeline 12 to greatly dilute the concentration of the radioactive material and decrease the hazards around the end of the pipeline 12. It may also be mentioned that when relatively short half-life materials are used, the radioactive material will rapidly decay following the inspection run to further decrease the hazards involved. This applies both to the slug of tracer fluid pumped out of the pipeline 12 and the tracer fluid which is deposited alongside the pipeline at the leak points.

In the development of this invention, it has been found that the residual radioactivity along the length of the pipeline 12 following passage of the tracer fluid therethrough must be retained at a minimum to increase the sensitivity of the detection method. We have found that the residual radioactivity should be less than 0.002 microcurie per foot of pipeline. As previously indicated, this residual radioactivity is principally due to the deposition of radioactive material on the inner surface of the pipeline, which is caused either by undissolved organic radioactive material, or by the reaction or adsorption of inorganic radioactive material on the dirt or scale inherently present along the length of the pipeline. It is also necessary that a minimum of radioactive material be deposited on the detector unit, as by radioactive material depositing on the cups 44 of the detection unit as these cups scrape along the inner surface of the pipeline. When the recorder of the detector unit is set to record at about three times background radiation level, a deposition of as little as 0.01 microcurie of radioactive material on the detector unit will render the detector unit practically useless. We have found that the residual radioactivity and the deposition of radioactive material on the detector unit is held to a tolerable level when the inorganic radioactive material in the tracer fluid is held to a total of not more than one microcurie.

From the foregoing, it will be apparent that the present invention provides a simple, efficient and convenient method of inspecting pipelines of substantially any length or size. The inspection procedure is carried out while the pipeline is in operation, and thus is done without interfering with the normal operation of the pipeline. It will also be apparent that the entire inspection procedure is accomplished with the maximum of safety, and workmen on the project will not be subjected to hazardous radiation. For example, the forcing of the tracer fluid into the pipeline by means of an inert gas eliminates the contamination of pumping equipment, and the container 14 may be easily stored following an injection operation until the radioactive material deposited on the inner surfaces of the container is dissipated. Furthermore, when short half-life materials are used, the radioactive material deposited at leak points and stored with the pumped hydrocarbon fluids quickly dissipates to prevent any longtime hazardous radiation. Finally, it will be apparent that the present invention eliminates the necessity of lengthy and costly scraping or cleaning operations following the passage of a tracer fluid through a hydrocarbon product pipeline by the substantially complete elimination of inorganic radioactive material in the tracer fluid, as well as the complete elimination of undissolved organic radioactive material in the tracer fluid.

Changes may be made in the combination and arrangement of materials and steps and procedures as heretofore set forth in the specification and shown in the drawing, it being understood that changes may be made in the embodiments disclosed without departing from the spirit and scope of the invention as defined in the following claims.

What is claimed is:

1. A tracer fluid for use in the radiological detection of leaks in pipelines carrying hydrocarbon products comprising a radioactive, oil soluble organic material, and an organic scavenging material capable of chemically combining with inorganic radioactive materials to form oil soluble compounds.

2. A tracer fluid for use in the radiological detection of leaks in pipelines carrying hydrocarbon products, comprising a solution containing a gamma ray emitting, radioactive, oil soluble organic material, and an unsaturated hydrocarbon.

3. A tracer fluid as claimed in claim 2 wherein said unsaturated hydrocarbon is an olefinic compound.

4. A tracer fluid as defined in claim 2 wherein the organic material has a half-life of from one to eight days.

5. The tracer fluid defined in claim 2 wherein the solution contains from 0.1 to 1.0 percent by weight radioactive organic material.

6. The tracer fluid defined in claim 2 wherein the radioactive organic material contains in the molecules thereof a radioisotope selected from the group consisting of $Br^{82}$, $As^{76}$ and $Sb^{122}$.

7. A method of preparing a tracer fluid for use in the radiological detection of leaks in pipelines carrying hydrocarbon products, comprising the steps of:
  (a) irradiating an oil soluble, organic compound by neutron irradiation to produce a gamma ray emitter, then
  (b) contacting the iradiated organic compound with a scavenging material reactive with inorganic radioactive material traces formed by radiolysis of the organic compond.

8. The method defined in claim 7 characterized further to include the step of treating the mixture of radioactive material and scavenging material in an adsorbing filter, thereby removing suspended solids and reactive polar substances.

9. The method claimed in claim 7 wherein said scavenging material is an unsaturated hydrocarbon compound.

10. The method claimed in claim 9 wherein said unsaturated hydrocarbon compound is reactive with said inorganic radioactive materials to yield oil soluble substances.

11. A method of preparing a tracer fluid for use in the radiological detection of leaks in pipelines carrying hydrocarbon products, the steps of:
  (a) sealing an unsaturated hydrocarbon and an oil soluble organic compound in a closed container,
  (b) irradiating the container and the contents thereof with neutron radiation to produce a gamma ray emitter, then (c) dissolving the compound in an additional unsaturated hydrocarbon.

12. A method of preparing a tracer fluid for use in the radiological detection of leaks in pipelines carrying hydrocarbon products, comprising the steps of:
(a) irradiating an oil soluble organic compound by neutron radiation to produce a gamma ray emitter, then
(b) bubbling an unsaturated hydrocarbon gas through the irradiated compound to scavenge inorganic radioactive materials.

13. In a method of radiologically detecting leaks in a pipeline carrying a hydrocarbon product under pressure, the steps of:
(a) connecting a charging container to the pipeline,
(b) interposing an adsorbent filter between the container and the pipeline,
(c) feeding a gamma ray-emitting, radioactive, oil soluble organic material in liquid form into the container,
(d) providing communication between the container and the pipeline through the filter,
(e) forcing the radioactive, oil soluble organic material from the container through the filter and into the pipeline for movement through the pipeline with the hydrocarbon product, then
(f) following the radioactive, oil soluble organic material at some distance with a detection unit disposed within the pipeline.

14. The method claimed in claim 13 wherein the radioactive material is forced from the container by bubbling an unsaturated hydrocarbon gas through the radioactive, oil soluble organic material to develop a pressure over the material exceeding the pressure in the pipeline.

15. The method defined in claim 13 wherein the radioactive material is forced from the container by pressurizing the container with an inert gas at a pressure greater than the pressure in the pipeline.

16. The method defined in claim 13 wherein the filter is silica gel.

17. The method defined in claim 13 wherein the filter is charcoal.

18. The method defined in claim 13 wherein said filter comprises a metallic silver wire gauze.

19. The method defined in claim 13 wherein the radioactive material is an organic bromide.

20. The method defined in claim 13 wherein the radioactive material is an arseno-organic compound and said filter comprises a grid of metallic arsenic.

21. The method claimed in claim 13 wherein the radioactive material is an organic antimony compound and said filter comprises a grid of metallic antimony.

22. The method defined in claim 13 characterized further to include the step of dissolving the radioactive material in an olefinic hydrocarbon in the container.

23. A tracer fluid as claimed in claim 2 wherein said unsaturated hydrocarbon is an acetylenic compound.

References Cited by the Examiner
UNITED STATES PATENTS

| | | | |
|---|---|---|---|
| 2,904,484 | 9/1959 | Houston et al. | 204—154 |
| 2,968,721 | 1/1961 | Shapiro et al. | 250—106 X |
| 3,010,023 | 11/1961 | Egan et al. | 250—43.5 X |
| 3,045,119 | 7/1962 | Haney et al. | 250—106 |
| 3,075,077 | 1/1963 | Staker et al. | 250—106 X |
| 3,087,064 | 4/1963 | Curtice et al. | 250—106 |
| 3,129,331 | 4/1964 | Bourne et al. | 250—43.5 X |

RALPH G. NILSON, *Primary Examiner.*

ARCHIE R. BORCHELT, *Examiner.*